SHINJIRO TAKEUCHI,
*INVENTOR.*

BY Wadsworth, Linde & Brauck[?]

ATTORNEYS

United States Patent Office 3,718,872
Patented Feb. 27, 1973

3,718,872

MAGNETIC MODULATING SYSTEM

Shinjiro Takeuchi, Toda, Japan, assignor to Mishima Kosan Co., Ltd., Kitakyushu, Fukuoka Prefecture, Japan Filed June 7, 1971, Ser. No. 150,532
Claims priority, application Japan, Dec. 3, 1970, 45/107,018
Int. Cl. H03c *1/00*
U.S. Cl. 332—51 R 1 Claim

ABSTRACT OF THE DISCLOSURE

A magnetic modulating system has a magnetic core and two resonant circuits which are supplied with an alternating exciting current and an input signal. An alternating driving magnetic field is applied to the magnetic core and an alternating bias current is applied to a non-linear inductance element of a differential output circuit consisting of two resonant circuits composed of the non-linear inductor and a condenser. The output signal of the differential output circuit can be controlled according to the input signal so as to modulate the output signal with high sensitivity by means of a very small input signal.

BACKGROUND OF THE INVENTION

The present invention relates to magnetic modulation, and more particularly relates to a system for modulating an output wave form with high sensitivity by means of a very small magnetic field input signal.

A flux gate system is typically used in conventional magnetic modulators and the like. In this system, two magnetic cores are usually used, so that a slight deviation of a magnetic character of either of the magnetic cores influences the output wave form. This influence is represented by a quiescent current, i.e., an output wave form when there is no input signal. Therefore, if a very small input signal is applied under such a condition, it becomes difficult to distinguish between a signal component and a noise component. Accordingly, a magnetic core whose magnetic character is entirely consistent has been proposed in order to solve the above problem, but it is practically difficult to manufacture such a core.

SUMMARY OF THE INVENTION

The present invention has for its object to provide a magnetic modulating system by removing the above described defect and for carrying out the control of an output wave form with high sensitivity by means of a very small input signal from a standpoint of circuit construction.

Accordingly, one of the characteristics of the present invention is a feature of connecting two resonant circuits consisting of a non-linear inductance element and a capacitor with each other in the differential form and of controlling an output wave form by means of an input signal, so as to modulate the output wave form by means of a very small input signal by skillfully utilizing the resonant voltage-phase characteristic.

Furthermore, another characteristic of the present invention is that the modulated output wave form is determined by a resonant wave form of the resonant circuit, an alternating bias wave form and an input signal. The magnitude of the input signal determines the output wave form corresponding to the duration of the resonance wave form, which phenomena are useful as an AD converting element. This system can be widely applied to various fields requiring a small and light weight modulating element.

BRIEF DESCRIPTION OF THE DRAWINGS

The specific nature of the present invention and advantages thereof will become clearly evident from the following detailed description of a typical embodiment taken in conjunction with the accompanying drawings in which.

DESCRIPTION OF THE PREFERRED EMBODIMENTS

Figure 1:
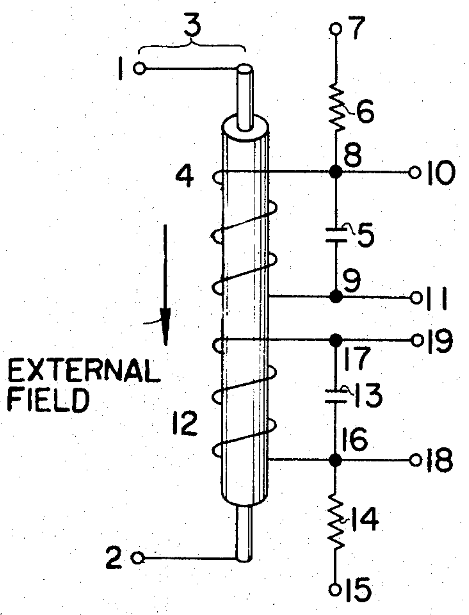
FIG. 1 is a basic constructional view of magnetic modulating elements used in the system according to the present invention.

In reference to the drawings, FIG. 1 shows a basic constructional view of the magnetic modulating elements in the system of the present invention. Elements 1 and 2 are terminals of a driving (or exciting) circuit for applying an alternating magnetic field to a magnetic core 3. The magnetic core 3 is composed of a conductor having terminals 1 and 2 and a magnetic substance covering the conductor.

Figure 2A:
FIGS. 2*a* and 2*b* are constructional views showing embodiments of the magnetic cores used in the magnetic modulating elements in FIG. 1.

Various methods can be employed for constructing the core 3. For example, a magnetic material such as Permalloy can be directly deposited or electrodeposited on the peripheral surface of a conductor such as a copper wire, or thin films of the magnetic substance can be directly wound or laminated on the conductor. An example of a rod-shaped magnetic core constructed by one of the above methods is shown in FIG. 2*a*.

In addition, the core can be constructed by coating an insulating material such as glass or the like on the peripheral surface of said conductor and then depositing the magnetic substance around the peripheral surface of the thus insulated layer by a method similar to above. Alternatively, the magnetic substance can be coated on the outer peripheral surface of an insulating material such as a cylindrical glass tube in the same manner as described above and the conductor such as a copper wire can then be inserted into the insulating material. The above constructing methods were described in detail using the conductor as the core. However, the portion corresponding to said conductor can be exchanged with the portion corresponding to said magnetic substance each other so as to provide the function of a magnetic core. However, the relation thereof is clearly understandable without explanation so that it is omitted.

In addition to the above, the present invention can be carried into effect by constructing the conductor and the magnetic substance or the conductor, the insulating material and the magnetic substance in the plane, prism, column, cylinder or the like and by depositing them in a single layer or in laminated layers.

Figure 2B:
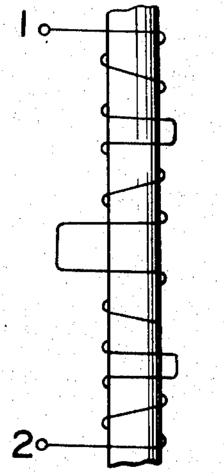

It should be understood that the configuration of the magnetic core 3 is not limited to any particular shape, and that the magnetic circuit can be a closed magnetic path or an open magnetic path. Also, the magnetic substance can be anisotropic or isotropic, and the direction of anisotropic is immaterial. Further, the magnetic substance of the magnetic core can be a magnetic thin film or a bulk, and can be either a metal or an oxide. In addition, the geometrical configuration of the magnetic core is not critical and the same effect can be obtained by properly positioning the coil and the state of the winding. As a result, the shape of the core can be a plane, a strip, a polygon, annular, spiral, a rod, or the like and either, porous or non-porous. A coil 4 is wound around the magnetic core 3. This coil 4 can be divided into two parts which are inversely wound with respect to each other so as to cancel any induced voltage in output terminals 8 and 9 (or 10 and 11) caused by an interlinking of the alternating magnetic field with the coil 4. Alternatively, the magnetic core can be constructed so as not to generate any induced voltage in the winding 4 as shown in FIG. 2*b*. The core and the winding 4 can also be constructed so that there is no interlinking said alternating magnetic field with the winding 4, i.e., in case that the relation between the direction of the alternating exciting current is at right angles to the coil 4.

In addition to the above-described method of directly winding the coil 4 around the outer periphery of the magnetic core 3, it is possible to indirectly wind the coil 4 around the outer periphery of the magnetic core 3. For instance, coil 4 can be previously wound around the outer periphery of a tube such as a hollow glass tube and the prepared magnetic core 3 can be freely inserted thereinto. Using this method, the magnetic core may be more economically manufactured as compared with the method of directly winding the coil 4 on the magnetic core 3. That is, if the circuit condition cannot be satisfied after manufacturing a circuit by the former method, not only the magnetic substance of the magnetic core 3 but also the winding 4 itself is wasted. If the latter method of winding the coil on a hollow tube is adopted, the coil 4 can be used for other magnetic cores. Thus it is apparent that it is not only economical but also advantageous to detect the magnetic character and the like, during the process of manufacturing the magnetic substance. A condenser 5 is connected between terminals 8 and 9 of the non-linear inductance element constructed as described above so as to form a resonance circuit with the inductor. Element 6 is an impedance for preventing a resonance current from flowing through said resonance circuit. The circuit between terminals 7 and 11 is an alternating bias circuit.

Circuit elements 12–19 correspond to the above elements 4–11, respectively, so that its explanation is omitted. These two circuits can be constructed separately or in combination with each other.

The magnetic modulating element according to the present invention is made by the above construction, but in addition, the same function can be achieved with the use of more than one of said magnetic cores by simply examining the existence of the DC bias circuit in order to construct the non-linear inductance element.

Figure 4:
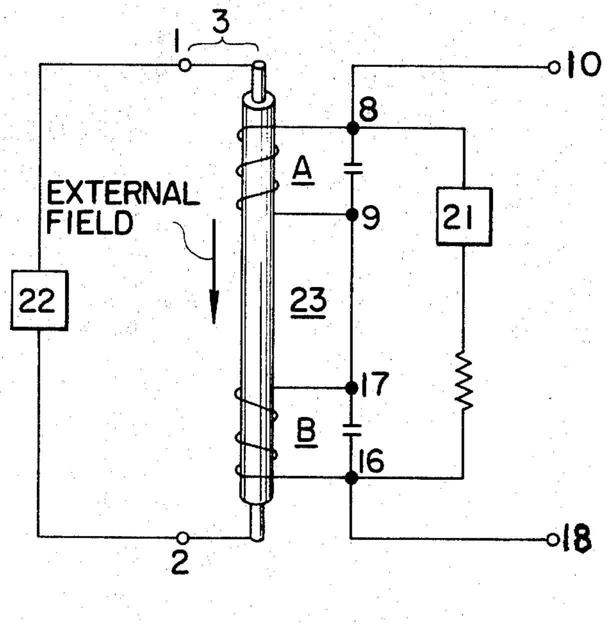
FIG. 4 is a circuit diagram of a magnetic modulating device showing an embodiment of the system according to the present invention.

The operation of the magnetic modulating element according to the present invention will now be explained with reference to FIGS. 1, 4 and 5.

In FIG. 1, the alternating exciting current wave form applied between the terminals 1 and 2 is not limited to any particular form so long as the two resonant circuits composed of said non-linear inductance element and condenser can be made to resonate. The phase of each resonant voltage generated in said resonance circuit O or $\pi$ and is determined by the polarity of the input signal or the alternating bias magnetic field. As the input signal, one can consider a current, the magnetic field and the resonance voltage phase characteristic change due to outside forces. In order to easily understand the operation of the system according to the present invention, the case of a typical magnetic field as the input signal will be explained in detail. The other cases are omitted as they are easily conceived.

At first, we will examine the operation of the magnetic modulating element when exposed to a parallel magnetic field. In this case, as an example of the circuit construction, a differential output circuit composed by short-circuiting the terminals 11 and 19 is considered. This circuit is explained hereinafter with reference to FIGS. 1 and 4.

Figures 5A, 5B, 5C, 5D:
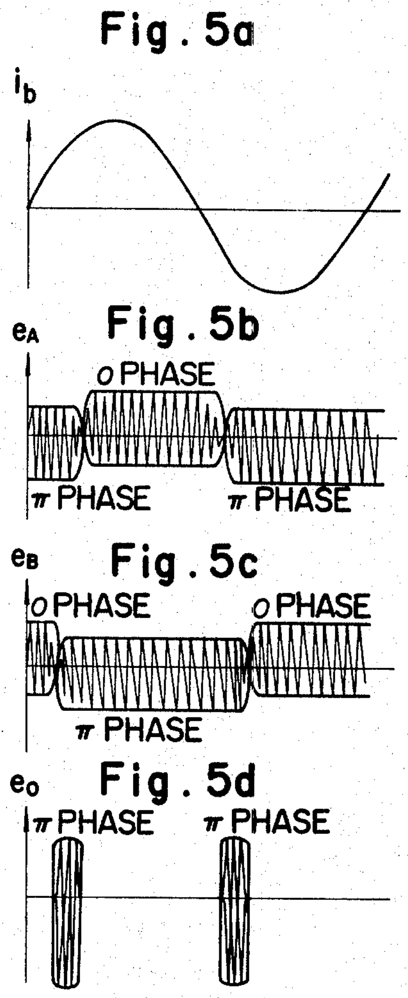
FIGS. 5*a–d* are waveforms explaining the operation of the magnetic modulating device of FIG. 4.

In FIG. 1, if the alternating driving current is applied to the terminals 1 and 2, a resonant voltage resonated at phase O or $\pi$ is generated in the resonance circuit composed of capacitor 5 and coil 4 (referred to as the resonance circuit A hereinafter) and the resonance circuit composed of capacitor 13 and coil 12 (referred to as the resonance circuit B hereinafter). Hereupon, if an alternating bias current $i_B$ as shown in FIG. 5*a* is applied to the alternating bias circuit 7–6–8–4–9–11 (referred to as the alternating bias circuit A hereinafter) and an alternating bias circuit 15–14–16–12–17–19 (referred to as the alternating bias circuit B hereinafter) through the terminals 7 and 15, the phases of the resonance voltages generated in the resonance circuits A and B are always in the reverse state with respect to each other. Therefore, the output wave forms at the terminals 10 and 18 of the differential output circuit appear as the sum of the resonance voltages of both of the resonant circuits when the resonant voltage phase characteristics coincide with each other. Therefore, when the resonant circuit is oscillating, the output becomes zero. If a parallel magnetic field is then applied, deviation is caused in the phase inverting period of each of the resonant voltages $e_A$ and $e_B$ of the resonant circuits A and B as shown in FIGS. 5*b* and 5*c*, so that the resonant voltage $e_O$ of O or $\pi$ phase corresponding to the polarity of the parallel magnetic field is observed between the terminals 10 and 18 as shown in FIG. 5*d*. Further, the period of this output voltage depends on the strength of the parallel magnetic field.

Next, a partial magnetic field, for instance, the case that the input signal is the difference of the magnetic field applied to the resonance circuits A and B, respectively, is considered. In this case, the alternating bias current is applied through the terminals 7 and 15 and the alternating bias magnetic field in the same direction is generated in the magnetic core 3. The differential output circuit is constructed by short-circuiting the terminals 11 and 18 so as to detect the output wave forms at the output terminals 10 and 19. The operation of the circuit thus constructed can be explained from the case of the parallel magnetic field, so that it is omitted.

Tbe above differential output circuit is constructed so that the output appears as the sum of the resonant voltages when a magnetic field is applied as the input signal.

In addition, there is another construction of the differential output circuit having an output which is the difference of the resonant voltages. Further, a circuit having the same function as explained above can be constructed by arranging two rod-shaped magnetic cores in parallel provided with one resonant circuit. These constructions can naturally be carried into effect from the above explanation, so that they are omitted, too.

Further, the feature of constructing the magnetic modulating element of the system according to the present invention with the use of a plurality of magnetic cores is as described above, but the construction for obtaining a modulated output wave form at every component by separating the input signal to each component with the use of one (for instance, an annular-shaped magnetic core) or more than two magnetic cores can naturally be conceived.

The above explanation was made under the condition that the resonance voltage phase characteristics of both resonance circuits are entirely equal. However, even if the voltage phase characteristics are different from each other, their adjustment can easily be made by properly controlling the alternating bias current values of the alternating bias circuits A and B. A hysteresisless voltage phase characteristic can then be realized.

Hereinbefore, the basic magnetic field was employed as the input signal. If it is desired to use a current as an input signal, this can easily be carried into effect by providing an input circuit for generating the above mentioned magnetic field. For instance, it is possible to superimpose currents as an input signal on the alternating bias circuit or it is also possible to provide an input circuit by winding a coil around the magnetic core 3.

Further, from a different point of view, apart from the case where the resonant voltage phase characteristic is not changed by the input signal as explained before, it is possible to actively change the characteristic by the use of the input signal. In this case, any type of input which can change the resonant voltage phase characteristics is effective as an input signal. This is possible because of the phenomenon that the output wave forms are controlled in proportion to the deviation between the voltage phase characteristics of the resonance circuit.

An example of a magnetic modulating device will now be explained with references to FIGS. 3*a*, 3*b* and 4.

Figure 3A:
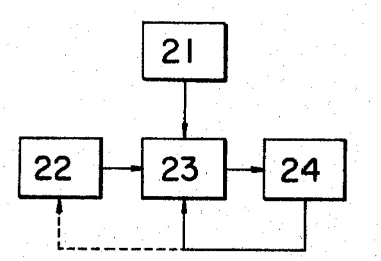
FIGS. 3*a* and 3*b* are block diagrams of the magnetic modulating devices showing embodiments of the system according to the present invention.

In FIG. 3*a*, element 21 shows an alternating bias power source, 22 shows an oscillation (or excitation) power source, 23 shows a magnetic modulating element, and 24 shows a signal treating (or utilizing) part.

The wave form of the alternating bias applied to the magnetic modulating element 23 from the alternating bias power source 21 can be optional, but it should be a stabilized wave form. Further, as described above, the peak value of the alternating bias should be set to alternately and repeatedly obtains $\pi$ or O of the resonance voltage phase when the input signal is present, and to operate as an overexciting state against the input signal.

The main function of the excitation power source 22 is to produce a parametric excitation for maintaining the magnetic modulating element in an operating state. When there is a plurality of the magnetic modulating elements 23 which must be selected, they should be composed to select the magnetic modulating elements 23 by supplying an electric power and to carry out the on and off actions for supplying the electric power. Further, it is of course possible to control each component of the exciting wave forms in accordance with the input signal. To this end, the controlling function is contained in the signal treating part 24.

As an input signal for the magnetic modulating element 23, each of the components for influencing the resonant voltage phase characteristic is effective, so that the construction of the magnetic modulating element 23 can be changed according to the kind of input signal in order to convert the input for meeting each kind of input signal with a desired object. For instance, when using the magnetic field as an input signal, the magnetic modulating element 23 is constructed such that the magnetic field is crossed at right angles with the output winding in order to effectively apply the component to be measured on the modulating element. When using the characteristic change due to an outer force as an input signal, the magnetic modulating element 23 is constructed such that compressed distortion, tension, torsion or the like is directly or indirectly and effectively applied to magnetic modulating element 23. In addition an input signal can be applied through the exciting power source or the bias power source for the magnetic modulating element 23.

The signal treating part 24 is used to treat the signal converted at the magnetic modulating element 23; so that when using a plurality of magnetic modulating elements 23, the same number of signal treating circuits must be provided and each magnetic modulating element 23 is treated by a signal treating circuit by scanning.

Hereupon, the input wave form to the signal treating part 24 is an alternating wave (alternating wave form intermittent under the state of oscillation) changed in proportion to the input signal, so that it can be used, if necessary, a peak wave detecting circuit, a phase detecting circuit, an inversion detecting circuit, diode detecting circuit, reference phase generating circuit, a reference voltage generating circuit, a pulse counting circuit, a pluse duration comparing and detecting circuit, a filter, a gate circuit, a differentiation circuit, an integration circuit, an amplifying circuit, differential amplifying circuit, an indication circuit or the like. Particularly, in the state of oscillation, there is an advantage that the magnetic modulating element 23 per se has an AD converting function.

Figure 3B:
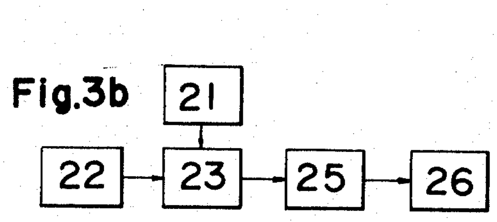

Next, in FIG. 3*b*, an example for the digital indication after AD conversion is particularly shown, in which the alternating bias power source 21, the excitation power source 22 and the magnetic modulating element 23 are the same as those in FIG. 3*a*. In addition, there are provided a gate circuit 25 and a pulse counting circuit or a digital indicating circuit 26 used as a signal treating circuit.

As apparent from the above explanation, according to the system of the present invention, the alternating driving magnetic field is applied to the magnetic core where the alternating driving current and the input signal are applicable. The alternating bias current is applied to the non-linear inductance element of the differential output circuit consisting of two resonance circuits composed of the non-linear inductance element and the condenser, thereby the output wave form of said differential output circuit can be controlled in proportion to the input signal so as to modulate the output wave form with high sensitivity by means of a very small input signal.

Moreover, the phenomena that the modulated output wave form is determined by the resonant wave form of the resonant circuit, the alternating bias wave form and the input signal, and that the magnitude of the input signal determines the output wave form corresponding to the duration of the resonance wave form make the system useful as an AD converting element when the resonance circuits are oscillating.

What is claimed is:

1. A magnetic modulating system comprising two parametric excitation reasonant circuits differentially connected to each other; each circuit comprising a non-linear inductance element, an inductor and a capacitor; means for supplying an alternating exciting current to said non-linear elements for generating an alternating magnetic field therein; means for supplying an AC bias current to each of said circuits for periodically inverting the phase of the voltage of said circuits; and means for supplying an input signal such as an external magnetic field to each of said circuits for controlling the phase inverting periods of the voltage-phase characteristics of each of said circuits; whereby the output waveform of the differentially connected parametric excitation resonant circuits is modulated in accordance with the period of the AC bias current.

References Cited

UNITED STATES PATENTS

| | | | |
|---|---|---|---|
| 2,488,370 | 11/1949 | Boelens et al. | 332—51 R |
| 1,778,724 | 10/1930 | Osnos | 332—51 R |
| 2,075,380 | 3/1937 | Varian | 332—51 R |
| 2,565,799 | 8/1951 | Brattain | 332—51 RX |
| 2,703,388 | 3/1955 | McCreary | 330—8 X |

OTHER REFERENCES

Electronics, "Other Magnetics Move In on the Standard Ferrite Core," June 29, 1964, pp. 64–67, Vol. 37, No. 19.

ALFRED L. BRADY, Primary Examiner

U.S. Cl. X.R.

324—117 R; 330—8; 332—12